324-77 CROSS REFERENCE SEARCH ROOM

Sept. 1, 1964 H. L. MASON ETAL 3,147,443

RECOGNITION SYSTEM

Filed April 27, 1962 2 Sheets-Sheet 1

INVENTORS
Henry L. Mason
Julius H. Wright
BY Claude Funkhouser
Franklin J. Visek
ATTORNEYS

RECOGNITION SYSTEM

Filed April 27, 1962 2 Sheets-Sheet 2

INVENTORS
Henry L. Mason
Julius H. Wright
BY Claude Funkhouser
Franklin J. Visek
ATTORNEYS United States Patent Office 3,147,443

Patented Sept. 1, 1964

3,147,443

RECOGNITION SYSTEM

Henry L. Mason, Chevy Chase, and Julius H. Wright, Bethesda, Md., assignors to the United States of America as represented by the Secretary of the Navy Filed Apr. 27, 1962, Ser. No. 190,840
10 Claims. (Cl. 328—115)
(Granted under Title 35, U.S. Code (1952), sec. 266)

The invention described herein may be manufactured and used by or for the Government of the United States of America for governmental purposes without the payment of any royalties thereon or therefor.

This invention relates to a peak-recognition system and more particularly to a peak-recognition system which is capable of recognizing a confirmed peak and providing an output representative of the condition causing the confirmed peak.

The present invention is a highly efficient specialized computing system devised to meet a fairly common requirement—the recognition and classification of peaks of predetermined and arbitrary types as they occur irregularly in a continuously varying condition representable by a voltage waveform. The system works directly from the input waveform and for each peak provides an output pulse on a line specifying that particular class of peak. As compared to a conventional digital computing system which constantly quantizes the variable in magnitude and time, stores these whole numbers, and then manipulates them by sequential logic in order to analyze their characteristics, this invention offers simplicity and speed. Simplicity is obtained by eliminating conventional analog-digital conversions, sequential control and arithmetic units, and whole-number memory units. Speed is obtained by the direct and special nature of the linkages of the logic elements, so that the processed data output is available at essentially the instant all the raw input data for any single peak have been received. The special nature of the logic is such that the internal signal exchanges are minimal in number and, for each peak, relate only to a particular predetermined excursion, rather than to all intervening values of the signal. Only a single binary bit of intermediate data storage is required for any single peak detection and classification, and the classification is completed within the switching times for one simple voltage comparator and one gate.

The present invention employs direct logic for the recognition of voltage level peaks. The peak recognition system encompassed by the present invention employs a plurality of sensors each of which is sensitive to a particular level of signal voltage. The input variable voltage represents the change of a condition which may be a type of movement, a temperature change or other condition which it is designed to monitor. Of course, peaks are recongized by the system only after an excursion is completed which is sufficient to confirm a true peak. It should, of course be understood that while the instant invention may find its principal employment in computer systems it may be employed to indicate the occurence of peaks in any one of a large number of changing conditions with the output fed to a computer, a visual indicator, a counter, or other desirable outputs.

An object of the present invention is to provide a system capable of monitoring a variable and detecting the occurrence of peak levels of the variable.

Another object of the invention is the provision of a system capable of monitoring a variable and confirming the occurrence of a peak level.

A further object is to provide a recognition system for sensing variations of a changing condition and confirming the occurrence of pre-defined variations of condition level.

Still another object of the present invention is the provision of a recognition system capable of detecting variations of a changing condition and confirming and classifying the occurrence of a plurality of pre-defined variations of condition level.

Yet another object is to provide a method of detecting variations of a variable condition and confirming the occurrence of pre-selected variations of condition level.

Still a further object of the present invention is the provision of a method of sensing variations in a variable condition and confirming and classifying the occurrence of a plurality of pre-selected variations of condition level.

Other objects and many of the attendant advantages of this invention will be readily appreciated as the same becomes better understood by reference to the following detailed description when considered in connection with the accompanying drawings wherein.

Figures 1, 3, 4:
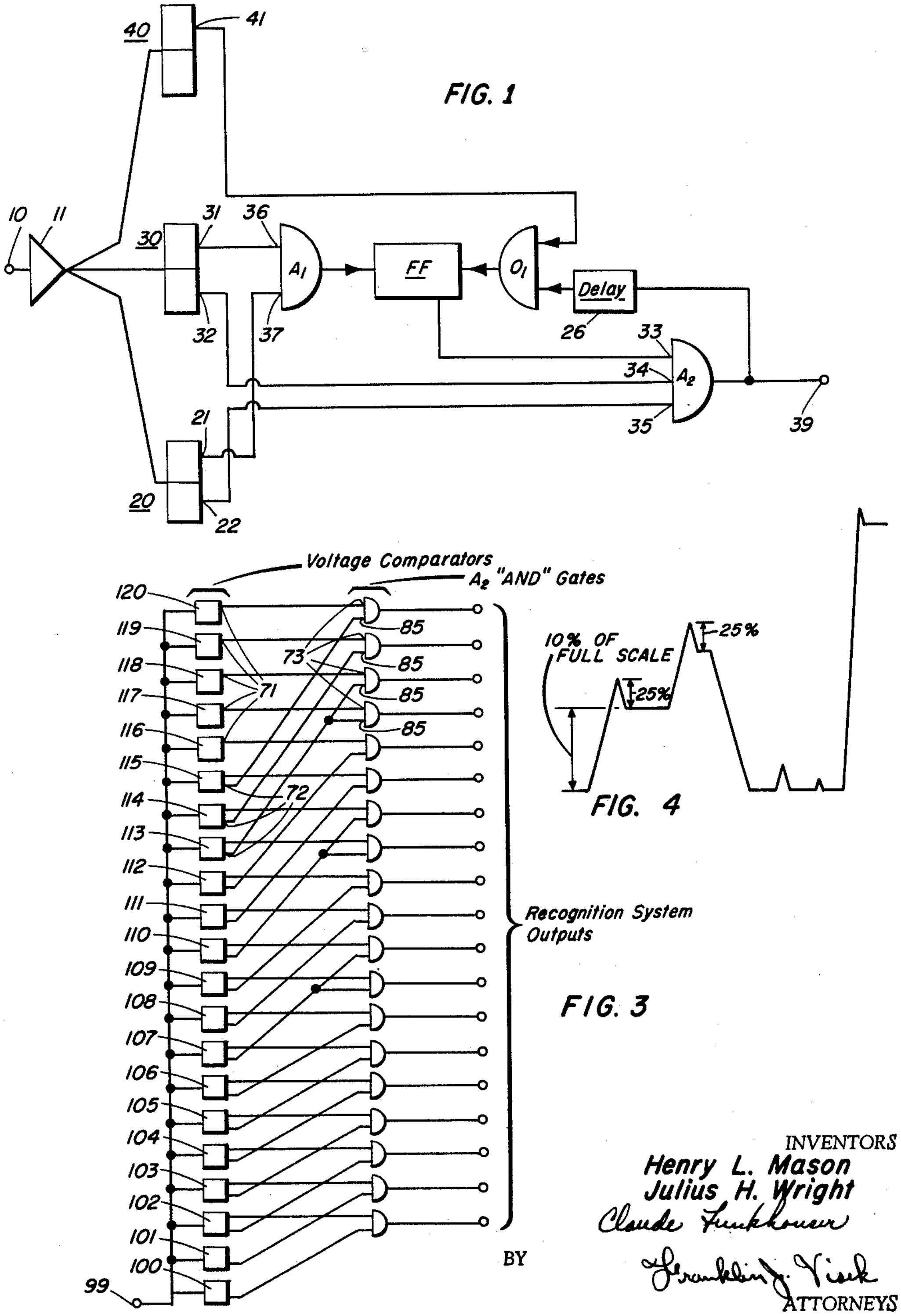
FIG. 1 illustrates a schematic block diagram of one embodiment of the invention.
FIG. 3 illustrates a partial schematic block diagram of the inter-connection of a plurality of the recognition systems of the present invention.
FIG. 4 illustrates a graphic presentation of the peaks and declines in the input signal.

Referring now to the drawings, wherein like reference characters designate like or corresponding parts throughout the several views, there is shown in FIG. 1 a signal input 10 of a voltage which varies so as to represent the monitored condition which is correspondingly variable. To isolate the instant invention the input 10 is fed through a buffer amplifier 11 to parallel connected voltage comparators 20, 30, and 40 which may be of any well known design, such as that shown in one of Patents 2,958,823, 3,072,895, or 3,099,000 for example.

Each of these comparators is selected to operate at a higher signal voltage than the voltage comparator below it. That is, voltage comparator 30 is selected to operate at a voltage level above the operating voltage level of voltage comparator 20 but below that of voltage comparator 40. Where the voltage level of the signal fed through amplifier 11 is below the operating level of voltage comparator 20 both voltage comparators 20 and 30 will have positive outputs at their respective lower output terminals 22 and 32. In this manner, the voltage comparators 20 and 30 indicate that the input signal is below their respective operating levels. Where the input signal is above the operating level of voltage comparator 20 but below that of voltage comparator 30, voltage comparator 20 will provide a positive output at its upper output terminal 21 to indicate that the input signal is above its operating level, while the positive output of voltage comparator 30 will remain at lower output terminal 32. When the input signal is above the operating level of voltage comparator 30 but below that of voltage comparator 40, the voltage comparators 20 and 30 will provide positive outputs at their respective upper output terminals 21 and 31 to indicate this condition. Of course, as long as the input signal level remains below the operating level of voltage comparator 40 no output will be derived therefrom since voltage comparator 40 employs only a single upper output 41 for indicating the occurrence of an input voltage level above rather than below its operating level.

The output terminals of voltage comparators 20 and 30 are connected to the inputs of "and" gates $A_1$ and $A_2$, which "and" gates produce an output only if all their inputs are positive. Thus, unless inputs 33, 34, and 35 sense positive signals "and" gate $A_2$ will not conduct. In like manner, unless input terminals 36 and 37 sense positive signals "and" gate $A_1$ will not conduct.

Whenever both inputs 36 and 37 of "and" gate $A_1$ sense positive signals, gate $A_1$ conducts a positive signal to the flip-flop circuit FF to thereby set the flip-flop circuit from an "off" condition to an "on" condition and conduct a positive signal therefrom to the input terminal 33 of the "and" gate $A_2$. From the above it is clear that when the input signal is below the operating level of voltage comparator 20 no output signal from "and" gate $A_2$ at output 39 will be sensed, since only lower output terminals 22 and 32 of the voltage comparators 20 and 30 are in a positive voltage condition causing positive signals to be sensed by inputs 34 and 35 of the "and" gate $A_2$. Thus, the inputs 36 and 37 of gate $A_1$, not sensing positive signals from voltage comparator upper outputs 21 and 31, fail to cause gate $A_1$ to conduct so as to set the flip-flop FF to its "on" condition. Therefore, no positive signal will be sensed at the input terminal 33 of "and" gate $A_2$.

It may be seen, therefore, that a positive signal cannot be applied to the input terminal 33 of "and" gate $A_2$ until the voltage level of the input signal 10 has reached a level above the operating level of the voltage comparator 30. When, however, the input signal has risen to a level above the operating level of voltage comparator 30 positive outputs will be sensed by inputs 36 and 37 of "and" gate $A_1$ from the upper outputs 21 and 31 of voltage comparators 20 and 30, respectively. The coincidence of positive signals at the input terminals of the "and" gate $A_1$ causes conduction and the setting of the flip-flop to an "on" condition by triggering the flip-flop to its second or "on" state. In this manner the flip-flop applies a positive signal to the input terminal 33 of the "and" gate $A_2$. At this point no positive potential is being applied from the outputs 22 and 32 to the respective inputs 35 and 34 of "and" gate $A_2$. Therefore, the "and" gate $A_2$ will not have a positive signal applied to all three of its input terminals 33, 34, and 35 until the input 10 lowers to a level below the operating level of voltage comparators 20 and 30 so as to cause a positive output from output terminals 22 and 32 of voltage comparators 20 and 30, respectively. At this point then, all the inputs to the "and" gate $A_2$ are positive. That is, the input signal is below the operating levels of voltage comparators 20 and 30, and the flip-flop circuit has been triggered into a set condition so as to continue to apply a positive signal level to the input 33 of "and" gate $A_2$ until the flip-flop is reset.

From the foregoing it can be understood that the "and" gate $A_2$ has an output when, and only when, a pre-selected voltage level rise has occurred at the input, followed by a succeeding decline in that input voltage level, so as to meet the definition of a peak which has been designed into the circuit. For the purposes of FIG. 1 it is clear that a peak as defined therein is any variation in the input voltage which rises above a given voltage comparator but not beyond a comparator set to the next higher level, and then declines to a level below the operating level of a voltage comparator which operates at a lower level than that of the voltage comparator beyond which the peak had risen.

In addition to the transmission of the output 39 of the "and" gate $A_2$ to a computer, recorder or controller, the output is fed through a delay 26 to "or" gate $O_1$ which in response thereto will cause the flip-flop circuit to be triggered into a reset or "off" condition. Delay 26 is employed primarily to enable the output signal to have a sufficient duration before cut-off by flip-flop FF so as to be satisfactorily recognized and employed by the computer to which it is fed. This delay may, however, be simply achieved by the delay of the components themselves.

Each voltage comparator recognition circuit employs an "or" gate $O_1$ which has a connection, which may be termed an inhibit line, thereto from a higher voltage comparator. This makes it impossible to achieve a count of a peak of one class when the input signal continues to increase to become a higher class of peak which is either not to be counted or which is to be counted by the next higher voltage comparator circuit. Thus, if the input signal in FIG. 1 should rise to a point above the operating level of voltage comparator 40 a positive signal would be applied through output terminal 41 thereof through the inhibit line to the "or" gate $O_1$ causing the flip-flop FF to be triggered into an "off" or reset condition. Thus, it is impossible for an output count representing the recognition of a peak of the class generally to be counted or recognized by the operating voltage level of the voltage comparator 30, to appear at output 39. It should be understood that the flip-flop FF is of the pulse-triggered flip-flop type which when set or reset in one of its two "on" or "off" conditions will remain in that condition until triggered into the other condition by a positive-going pulse.

Figure 2:
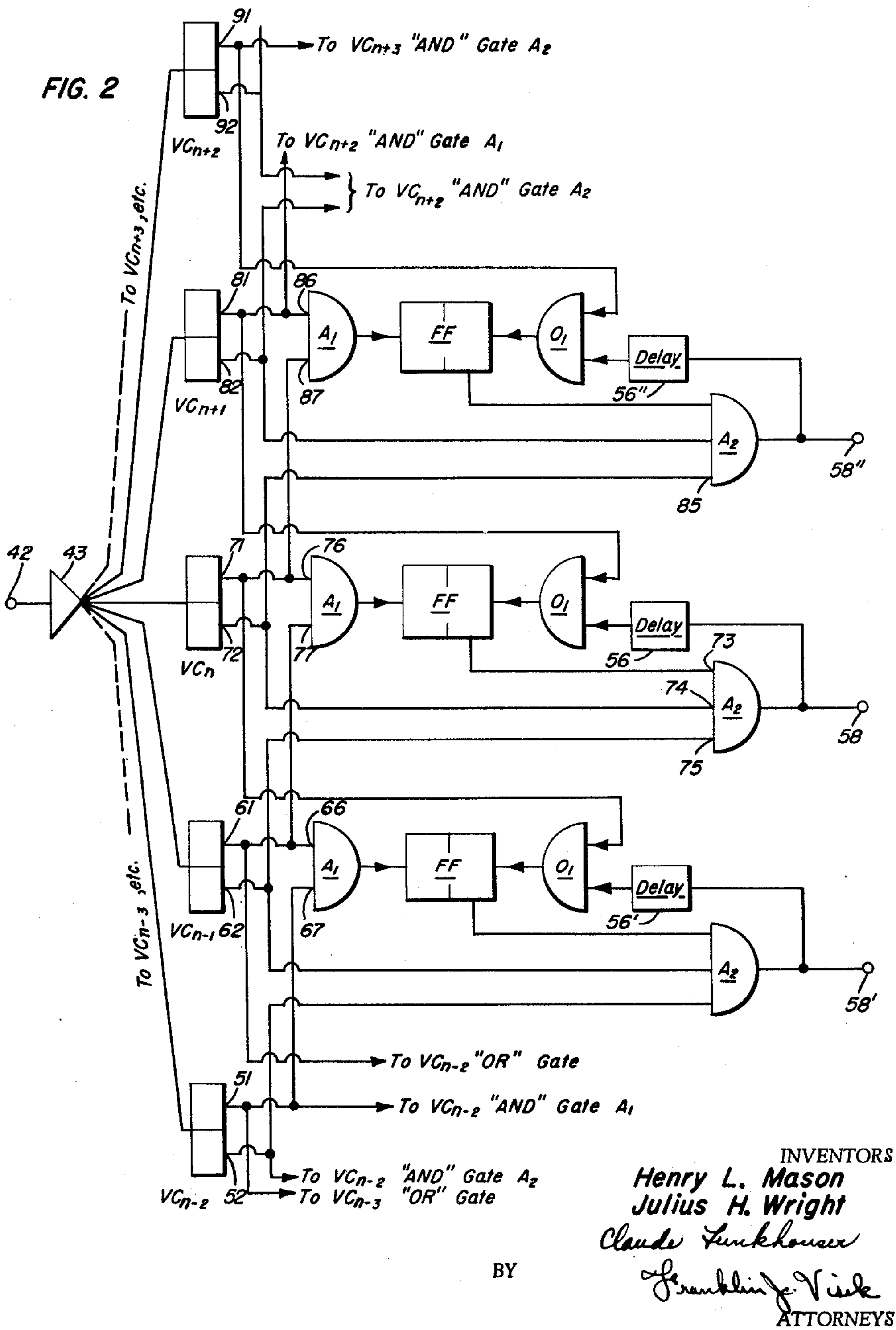
FIG. 2 illustrates a schematic block diagram of another embodiment of the invention.

While FIG. 1 discloses a circuit which may be employed to recognize but one type of input variation or class of variations, the recognition circuit set forth in FIG. 2 may be employed to recognize any number of classes of variations of the input signal from input 42. Such a circuit has a plurality of voltage comparator circuits which employ a series of voltage comparators and are employed in the same manner as the voltage comparator circuit of voltage comparator 30 in FIG. 1. In FIG. 2, however, the output of the voltage comparators, such as the output 71 of voltage comparator $VC_n$, are in each instance connected not only to their respective "and" gate $A_1$ such as to input terminal 76 of "and" gate $A_1$ but also to an input terminal of the next higher "and" gate of $A_1$ of the next higher voltage comparator gating circuit such as input terminal 87. Of course, the output 71 of the voltage comparator $VC_n$ as well as the corresponding outputs of the remainder of the voltage comparators such as 51, 61, 81, 91 as seen in FIG. 2 is connected to the "or" gate of the voltage comparator circuit of the next lower voltage comparator. In like manner all of the outputs of the voltage comparators such as output 72 of voltage comparator $VC_n$ are connected not only to the "and" gate $A_2$, such as through input 74 of its own respective voltage comparator gating circuit, but also to the input of an "and" gate $A_2$ such as through input terminal 85 on the "and" gate of the next higher voltage comparator circuit. Thus, it can be seen that through the judicious selection of voltage comparators and the judicious selection of the differences in operating levels therebetween, as well as the selection of a satisfactory plurality of voltage comparator recognition circuits, a plurality of outputs may be obtained each indicating a different class or level of input condition variations.

As can be best seen in FIG. 3, the connection of the various voltage comparator circuits may be adjusted so as to meet any arbitrary criteria needed for the process of monitoring a particular condition change. Voltage comparators 100 to 120 are connected to an input 99. These twenty voltage comparators may be selected to detect, for example, a variation in input of a pressure variation of from 0 to 2 pounds, with adjacent comparators set to measure a difference of 0.1 of a pound, or from 0 to 20 pounds, with differences of 1 pound, or in the range of 50 to 70 pounds. The pattern of differences may be quite arbitrary, if desired. Thus, it can be seen that both the individual difference values and the total scale or range over which the voltage comparators will detect a variation are unlimited.

FIG. 3 is connected to approximately meet the criteria that to be a true peak, any rise from a prior value of input must be followed by a decline which must exceed 25 percent of the input at that peak and must also exceed 10 percent of the full-scale value. This feature of the device is graphically shown in FIG. 4 wherein it can be clearly seen that the decline must exceed 25 percent of the total value of the peak, regardless of the full scale value of the peak, and that the level of this decline must still be more than 10 percent of the full scale value of the peak. It should, of course, be understood that the "and" gates $A_1$ and the flip-flops have been, for simplicity, omitted from FIG. 3. Thus, the voltage comparator outputs 71 are shown as if connected directly to "and" gate $A_2$ inputs 73. These outputs and inputs correspond, respectively, to the output 71 of voltage comparator of $VC_n$ and the input 73 of "and" gate $A_2$ of FIG. 2. Output 72 of the voltage comparators of FIG. 3 as well as the inputs 85 of the "and" gates $A_2$ also correspond, respectively, to the output 72 of voltage comparator $VC_n$ and the input 85 of "and" gate $A_2$ of the next higher voltage comparator gate circuit of voltage comparator $VC_{n+1}$. It can be seen that FIG. 3 adheres to the criterion that the subsequent decrease of input level shall be approximately 25 percent or more of the value of the input at its peak. For example, if the voltage input level has risen to the operating level of voltage comparator 120, the twentieth and highest voltage comparator in the scale, it is required that for the peak to be confirmed as an actual peak, as defined by the criteria, the input level shall subsequently drop to a point below the operating level of voltage comparator 115. This can be obviously seen from the fact that "and" gate $A_2$ of voltage comparator 120 requires a positive signal at input 85 from the output 72 of voltage comparator 115. Thus, there is a difference of five steps from voltage comparator 115 to 120, or from the fifteenth voltage comparator to the twentieth, which is one-fourth or 25 percent of the value of the input voltage needed to reach the operating value of voltage comparator 120.

The criterion that an input voltage rise must exceed 10 percent of the full-scale value simply requires that the outputs such as 72 of the voltage comparators 100 to 120 shall be connected to the inputs such as 85 of the "and" gates $A_2$ of voltage comparators having at least two steps higher operating level, since 10 percent of the scale of 20 voltage comparators would be 2. As can be clearly seen in FIG. 3, where, along the scale, it is required to effectuate a transition, in applying the output voltage of a voltage comparator such as 72 to the input of a voltage comparator such as 85, so as to change from two steps to three steps upwards, the input is applied to input terminals 85 of two of the "and" gates $A_2$. Thus, the output 72 of voltage comparator 113 is connected to inputs 85 of both the voltage comparator 117 and voltage comparator 118.

While the above description of the structure and operation of the invention has been directed to the measurement of positive peaks, and the application of positive potentials to the "and" gates, it is to be understood that the same circuit configuration can be used for input signal waveforms which are negative, with appropriate arrangement of the interconnections to provide the desired criteria for negative peaks, without departing from the scope of the invention.

Since the input voltages to the "and" gates, for example, may be either positive or negative, depending on the particular type signal peak that is being measured, these voltages may be more aptly called "enabling voltages" since they do, in fact, enable or activate, the specific circuits to which they are applied. The word "positive" has been used throughout the specification for the sake of consistency since the device was stated to be measuring positive peaks.

Obviously may modifications and variations of the present invention are possible in light of the above teachings. It is, therefore, to be understood that within the scope of the appended claims the invention may be practiced otherwise than as specifically described.

What is claimed is:

1. A recognition system for indicating variations of a condition comprising system input means for supplying a voltage varying correspondingly with said condition, a first gating means, a second gating means for providing an output from said recognition system a plurality of, voltage comparator means connected to said system input means each of said voltage comparator means having a predetermined operating level and all but one of said comparators being connected to both the first and second gating means, a first output means connected to said second gating means for providing a potential thereto when said input is below said operating level, and a second output means connected to said first gating means for providing a potential thereto when said input is above said operating level, and bistable means having a first input from said first gating means for being switched from a first stable state to a second stable state, an output to said second gating means for conditioning said second gating means for conduction of an output and an input from said second gating means for switching said bistable means from said second stable state to said first stable state when said second gating means is conductive whereby said output of said second gating means indicates the occurrence of a preselected input voltage level.

2. A recognition system for indicating variations of a condition comprising a system input means for supplying a voltage varying correspondingly with said condition, a first "and" gate, a second "and" gate, an "or" gate, first, second, and third voltage comparators each connected to said system input means, said first voltage comparator having first and second outputs for respectively applying enabling potentials to said first and second "and" gates when said input is respectively below and above the operating level of said first voltage comparator, said second voltage comparator having an operating level above said operating level of said first voltage comparator and having first and second outputs for respectively applying enabling potentials to said first and second "and" gates when said system input means is respectively below and above the operating level of said second voltage comparator, bistable means having a first input from said first "and" gate for pulsing said bistable means from a first stable "off" state to a second stable "on" state and having an output to said second "and" gate for applying an enabling potential thereto when said input is above said operating levels of said first and second voltage comparators whereby said second "and" gate provides an output from said system when said system input rises above the operating level of said second voltage comparator and subsequently drops below said operating voltage level of said first voltage comparator, said "or" gate having an input from said second "and" gate output for providing to a second input of said bistable means a reset pulse whereby said system is reset after an output from said system has occurred, said third voltage comparator having an operating level above the operating level of said second voltage comparator and having an output for applying an enabling potential to said "or" gate for applying a reset pulse to said bistable means when said system input rises to the operating level of said third voltage comparator thereby allowing an output from said recognition system only when said system input rises to a level above said operating level of said second voltage comparator but remains below said operating level of said third voltage comparator and subsequently lowers to a level below the operating level of said first voltage comparator.

3. A recognition system for indicating the occurrence of a preselected variation of a condition comprising system input means for supplying a voltage varying correspondingly with said condition; a first "and" gate; a second "and" gate, a first voltage comparator connected to said input having a first output for applying a first enabling potential to said first "and" gate when said input voltage is above the operating level of said first voltage comparator, and a second output for applying a first enabling potential to said second "and" gate when said input voltage is below said operating level of said first voltage comparator; a second voltage comparator connected to said input having an operating level above said first voltage comparator, a first output for applying a second enabling potential to said first "and" gate when said input voltage is above the operating level of said second voltage comparator and a second output for applying a second enabling potential to said second "and" gate when said input voltage is below said operating level of said second voltage comparator, a flip-flop circuit having a first input from said first "and" gate for triggering said flip-flop circuit from a first stable state to a second stable and an output to said second "and" gate for applying thereto a third enabling potential; an "or" gate having a first input from said second "and" gate output and an output to a second input of said flip-flop circuit for applying a reset signal thereto; and a third voltage comparator connected to said input having an operating level above said second voltage comparator and an output for applying an enabling signal to a second input of said "or" gate to reset said flip-flop circuit when said input rises to the operating level of said third voltage comparator whereby said first "and" gate output indicates a predetermined variation in system input representing a variable condition.

4. A recognition system as claimed in claim 3 wherein said input means includes a buffer amplifier for isolating said recognition system from preceding electronic stages.

5. A recognition system for indicating the occurrence of a plurality of preselected variations of a condition comprising system input means for supplying a voltage varying correspondingly with said condition; a series of voltage comparator means each connected to said input means; said voltage comparator means each having a decreasing operating level below the operating level of the next voltage comparator means along said series from the first comparator means of said series having the highest operating level to the last comparator means of said series having the lowest operating level, each of said voltage comparator means having first and second output means for applying an enabling potential from said first output when said system input is below and from said second output when said system input is above said operating level, a plurality of gating circuits each having associated therewith one of said voltage comparator means and each of said gating circuits having a first gating means having a first input connected to said second output of said associated voltage comparator means and a second input from said first output of a voltage comparator means having a lower operating level than the operating level of said associated voltage comparator means whereby said first gating means is rendered conductive when both of said first gating means inputs are enabled; a bistable means having a first input connected to said first gating means for being triggered from a first stable state to a second stable state when said first gating means is rendered conductive; a second gating means for supplying an output from said gating circuit having a first input from said bistable means for applying an enabling potential when said first gating means is conductive, a second input from said second output of said associated voltage comparator means for applying an enabling potential when the level of said system input means is below said operating level of said associated comparator, and a third input from said second output of a voltage comparator means having a lower operating level than said operating level of said associated comparator, means for applying an enabling potential when said level of said system input means is below said operating level of said voltage comparator which has a lower operating level than said operating level of said associated comparator means whereby said second gating means provides an output when said first, second, and third inputs become enabled due to the rise of the level of the system input above the operating level of said associated voltage comparator means and subsequent fall below said operating level of said second voltage comparator means, and a third gating means having an output to a second input of said bistable means, a first input from said output of said second gating means for pulsing said bistable means from said second stable state to said first stable state when an output occurs from the gating circuit, and a second input from said second output of a voltage comparator means having a higher operating level than said operating level of said associated voltage comparator for pulsing said bistable means from said second stable state to said first stable state when said system input rises above the class of condition variation which is to be sensed by said associated voltage comparator means and its gating circuit whereby only confirmed condition variations of a preselected magnitude are sensed.

6. A recognition system as claimed in claim 5 wherein said bistable means comprises a flip-flop circuit capable of being pulse triggered from a first stable state to a second stable state and again from said second stable state to said first stable state.

7. A recognition system as claimed in claim 6 wherein said first gating means and said second gating means are "and" gates.

8. A recognition system as claimed in claim 7 wherein said third gating means is an "or" gate.

9. A recognition system as claimed in claim 8 wherein said system input means comprises a buffer amplifier for passing said varying input voltage and for isolating said recognition system from preceding electronic stages.

10. A recognition system as claimed in claim 9 wherein said voltage comparator means are each connected in parallel to said buffer amplifier input means.

References Cited in the file of this patent

UNITED STATES PATENTS

| | | |
|---|---|---|
| 2,752,589 | Delong | June 26, 1956 |
| 2,866,092 | Raynsford | Dec. 23, 1958 |
| 2,970,763 | Freeman | Feb. 7, 1961 |